(12) United States Patent (10) Patent No.: US 7,861,056 B2
Marathe et al. (45) Date of Patent: Dec. 28, 2010

(54) METHODS, SYSTEMS, AND COMPUTER PROGRAM PRODUCTS FOR PROVIDING MEMORY MANAGEMENT WITH CONSTANT DEFRAGMENTATION TIME

(75) Inventors: Rohini Marathe, Cary, NC (US); Jonathan E. Nocjar, Raleigh, NC (US)

(73) Assignee: Tekelec, Morrisville, NC (US)

( * ) Notice: Subject to any disclaimer, the term of this patent is extended or adjusted under 35 U.S.C. 154(b) by 542 days.

(21) Appl. No.: 11/708,668

(22) Filed: Feb. 20, 2007

(65) Prior Publication Data
US 2008/0162830 A1 Jul. 3, 2008

Related U.S. Application Data

(60) Provisional application No. 60/878,252, filed on Jan. 3, 2007.

(51) Int. Cl.
*G06F 13/00* (2006.01)
(52) U.S. Cl. .................. 711/173; 711/154; 711/156; 711/170; 711/171; 711/172; 707/813
(58) Field of Classification Search .................. 711/173
See application file for complete search history.

(56) References Cited

U.S. PATENT DOCUMENTS 5,339,411 A * 8/1994 Heaton, Jr. ................. 711/171
6,088,777 A * 7/2000 Sorber ....................... 711/171
2005/0149686 A1 * 7/2005 Bacon et al. ............... 711/170

OTHER PUBLICATIONS

Paul R. Wilson, Mark S. Johnstone, Michael Neely, David Boles, Dynamic Storage Allocation: A Survey and Critical Review, 1995, University of Texas at Austin.*

* cited by examiner

*Primary Examiner*—Kevin L Ellis
*Assistant Examiner*—Kalpit Parikh
(74) *Attorney, Agent, or Firm*—Jenkins, Wilson, Taylor & Hunt, P.A.

(57) ABSTRACT

Methods, systems, and computer program products for providing memory management with constant defragmentation time are disclosed. According to one aspect, the subject matter described herein includes a method for memory management. The method includes dividing memory to be allocated into a plurality of pages of equal size P, wherein P is an integer. The method also includes designating each page for holding records of a respective predetermined record size, at least some of the respective predetermined record sizes being different from each other, wherein, when filled, each page holds records of its respective predetermined record size and wherein at least some of the pages hold a remainder record having a size based on the page size P and the space allocated for the maximum number of records of the page's respective predetermined record size that will fit within the page. The method also includes allocating memory so that each page is populated with records of its respective predetermined record size.

34 Claims, 5 Drawing Sheets

METHODS, SYSTEMS, AND COMPUTER PROGRAM PRODUCTS FOR PROVIDING MEMORY MANAGEMENT WITH CONSTANT DEFRAGMENTATION TIME

RELATED APPLICATIONS

This application claims the benefit of U.S. Provisional Patent Application Ser. No. 60/878,252, filed Jan. 3, 2007; the disclosure of which is incorporated herein by reference in its entirety.

TECHNICAL FIELD

The subject matter described herein relates to methods and systems for memory management. More particularly, the subject matter described herein relates to methods, systems, and computer program products for providing memory management with constant defragmentation time.

BACKGROUND

In general, fragmentation of data storage memory requires periodic or as-needed cleanup to merge non-contiguous areas of free memory into larger usable chunks of contiguous memory. This defragmentation process is typically very processor-intensive and thus tends to cause a temporary reduction of processing power available for other tasks.

When defragmentation occurs only on an as-needed basis, it is typically triggered by a scarcity of free memory that is in contiguous chunks big enough to be useful. In these circumstances, the memory unavailability (due to the memory fragmentation), the processor drain (due to the defragmentation operation), or both may cripple a system severely enough that it cannot respond appropriately to incoming commands or data. As a result, critical data may be lost, and time-critical functions may not be performed within the time required.

Periodic defragmentation, on the other hand, may avoid the extreme problems that may be faced by systems that only use as-needed defragmentation, but periodic defragmentation also suffers possible disadvantages. For example, even if defragmentation occurs periodically, the amount of time that it takes to defragment memory strongly depends on the utilization of the memory as well as the size and distribution of both the used and unused sections of memory. In other words, defragmentation time under these conditions tends to be non-deterministic. Knowing this, in order to try to insure that the time-critical functions are not adversely affected, a designer of a system that performs time-critical functions may reserve a larger percentage of the available processing resources to the task of defragmentation than may be actually necessary. As a result, processing resources that might otherwise be available to perform the time-critical functions are unavailable. Thus, it is desired to have a defragmentation method that operates in constant time, i.e., in which the time to defragment does not vary depending upon the amount or percentage of the memory currently in use.

Accordingly, there exists a need for methods, systems, and computer program products for providing memory management with constant defragmentation time.

SUMMARY

According to one aspect, the subject matter described herein includes a method for memory management. The method includes dividing memory to be allocated into multiple pages of equal size P, where P is an integer. The method also includes designating each page for holding records of a respective predetermined record size, at least some of the respective predetermined record sizes being different from each other, where, when filled, each page holds records of its respective predetermined record size and where at least some of the pages hold a remainder record having a size based on the page size P and the space allocated for the maximum number of records of the page's respective predetermined record size that will fit within the page. The method also includes allocating memory so that each page is populated with records of its respective predetermined record size.

According to another aspect, the subject matter described herein includes a system for memory management. The system includes a memory for storing records, divided into multiple pages of equal size P, where P is an integer, and where each page is adapted for holding records of a respective predetermined record size, at least some of the respective predetermined record sizes being different from each other, where, when filled, each page holds records of its respective predetermined record size and where at least some of the pages hold a remainder record having a size based on the page size P and the space allocated for the maximum number of records of the page's respective predetermined record size that will fit within the page. The system also includes a memory manager for allocating memory so that each page is populated with records of its respective predetermined record size.

The subject matter described herein for methods, systems, and computer program products for providing memory management with constant defragmentation time may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

In accordance with the subject matter disclosed herein, systems, methods, and computer program products are provided for providing memory management with constant defragmentation time. Memory is divided into multiple equal-sized pages, which makes finding a page boundary mathematically trivial. Each page is designated to hold records of the same size, R. If these records of size R don't evenly fit into a page, the remaining space may be used to hold one record of a different size, M. For convenience, records of size R are called data records, and records of size M are called remainder records. Except for the size of the data stored, data records and remainder records are functionally equivalent. Because every available space within the page is used, memory utilization within every page may reach 100% with relative ease. Because each page holds data records of the same size, three distinct benefits arise. First, finding a record boundary within a page is mathematically trivial. Second, simple lists may be used to keep track of pages that have free records of the desired size, which reduces the complexity of a memory allocation and may reduce the time required to perform a memory allocation. Third, defragmentation may be by a deterministic method that is fast enough to operate in real-time, obviating the need for cumulative defragmentation. As a result of these benefits, higher system performance may be achieved, not only due to the extreme efficiency and performance of the memory management system and method, but also due to the reduction or elimination of both the out-of-memory error conditions caused by excessive fragmentation and the performance degradation due to system resources being occupied by a cumulative defragmentation task.

As used herein, the terms "allocate", "use", "reserve", and "occupy", when used with regards to memory records, are synonymous, and refer to a process in which a memory record is identified and designated for the purpose of storing particular data.

As used herein, the terms "release" and "free", when used with regards to memory records, are synonymous, and refer to a process in which a memory record is made available for immediate or future use or re-use.

Figure 1:
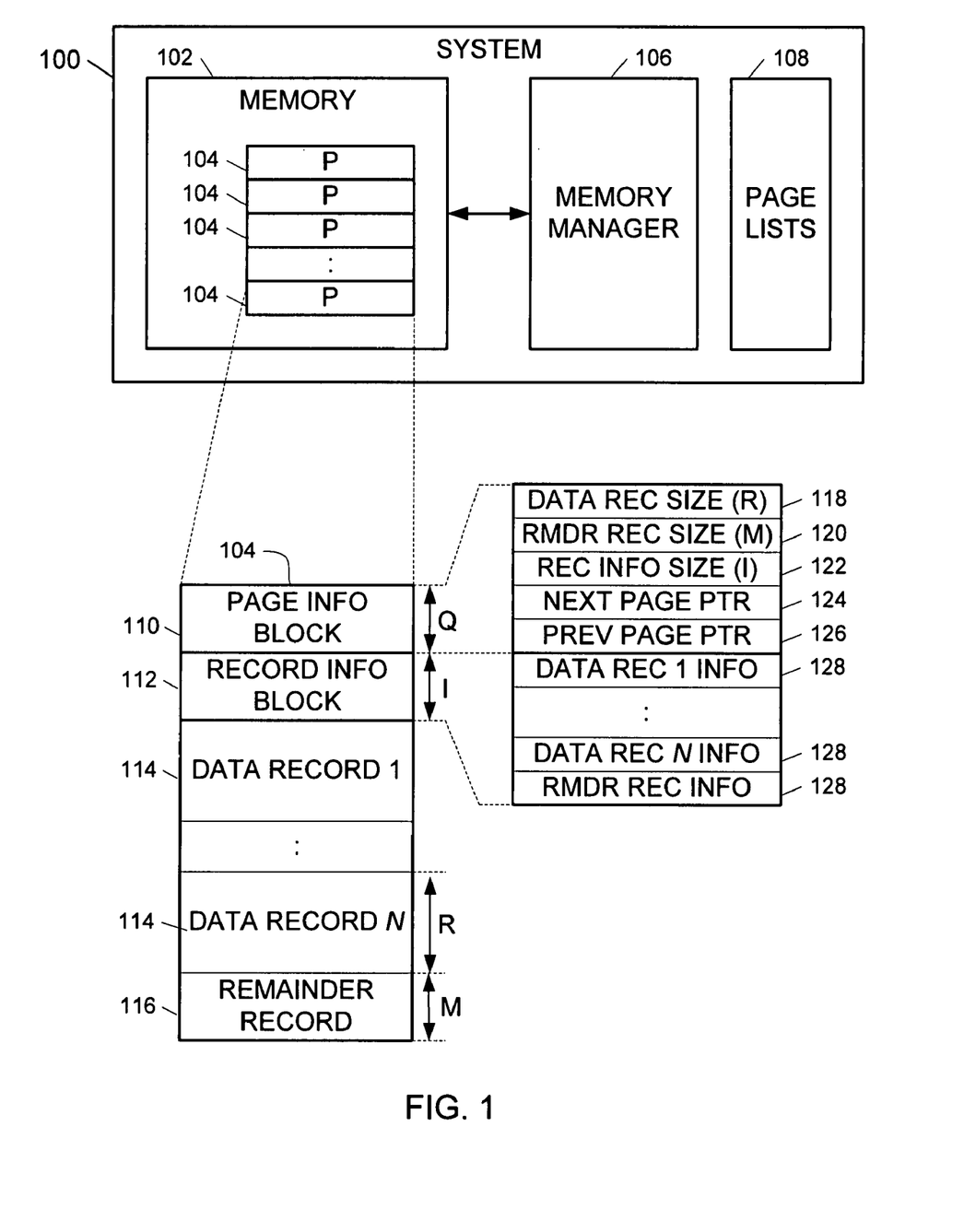
FIG. 1 is a block diagram illustrating an exemplary system for constant time memory management in accordance with an embodiment of the subject matter described herein.

FIG. 1 is a block diagram illustrating an exemplary system for constant time memory management in accordance with an embodiment of the subject matter described herein. System 100 may include a memory 102 for storing records, divided into more than one page 104 of equal size P. System 100 may include a memory manager 106 for allocating and releasing memory according to algorithms also described in more detail below and in FIG. 3 and FIG. 4. Memory manager 106 may use page lists 108 to keep track of pages according to the size of records stored in the page and according to the status of the page. Page lists 108 are described in more detail below and in FIG. 2.

In FIG. 1, each page 104 may contain a page information block 110 of size Q, record information block 112 of size I, one or more data records 114 of size R, and possibly a remainder record 116 of size M, depending on the relative sizes of page 104, page information block 110, record information block 112, and data records 114. The value of M may be calculated according to the following formula:

$$M=((P-(Q+I)) \bmod R)$$

If data record size R is such that an integer number of data records 114 evenly fill the page with no space left over, then page 104 may not include remainder record 116. For example, where system memory 102 is divided into pages of size 1000 bytes each, and where the size of the combined page information block 110 and record information block 112 is 100 bytes, if page 104 has been designated to hold data records 114 of size 50 bytes, page 104 will not include remainder record 116, because the data records 114 evenly fill the page:

$$M=((1000-100) \bmod 50)=0$$

In this example, page 104 will contain eighteen 50-byte data records 114 and no remainder record 116.

On the other hand, if the data record size R is such that data records 114 do not evenly fill the page, then page 104 may include remainder record 116. For example, where system memory 102 is divided into pages of size 1000 bytes each, and where the size of the combined page information block 110 and record information block 112 is 32 bytes, if page 104 has been designated to hold data records 114 of size 100 bytes, page 104 will include a 68-byte remainder record 116:

$$M=((1000-32) \bmod 100)=68$$

In this example, page 104 will contain nine 100-byte data records 114 and one 68-byte remainder record 116.

Page information block 110 may include information that is associated with each particular page. For example, page information block 110 may include a data record size indicator 118, a remainder record size indicator 120, a record information block size indicator 122, a next page pointer 124, and a previous page pointer 126. Data record size indicator 118 may be used to identify the page as one that has been designated to hold data records 114 of size=R. Remainder record size indicator 120 may be used to identify the page as one that can hold a remainder record 116 of size=M, or, if M=0, to indicate that the page has no remainder record 116. Record information block size indicator 122 may contain the value of I, which is the size of the record information block 112. Next page pointer 124 and a previous page pointer 126 may be used to create a linked list of pages which contain data records 114 of size=R.

Page information block 110 may also include information such as how many data records 114 are used, how many data records 114 are available, whether the remainder record 116 is used or free, and other information, such as information useful for memory management.

Record information block 112 may contain an information record 128, for each data and remainder record 116 within page 104. Each information record 128 may contain data that is associated with its respective data or remainder record, such as meta data, checksum data, and owner ID. For example, each information record 128 may contain an index into a back link pointer array (not shown) or other structure that stores information about the owner of the record, so that the owner may be informed when a data or remainder record has been relocated, for example as a result of a backfill operation. The owner of the record may be the application or process that requested the data or remainder record to be allocated.

The subject matter described herein is not limited to the example illustrated in FIG. 1, in which page information block 110 is located within each page 104. In an alternate embodiment, page information block 110 may be located outside of each page 104. For example, the page information blocks may be grouped together in an area of memory 102 that is outside of the group of pages, or in a memory or other storage device altogether separate from memory 102. Similarly, the subject matter described herein is not limited to the example illustrated in FIG. 1, in which each information record 128 is located within record information block 112. In an alternative embodiment, the information record 128 associated with each data or remainder record may be located contiguous to, or even within, its respective data or remainder record, for example. In yet another alternative embodiment, record information block 112 may be located outside of each page 104. Details such as the physical or logical location of the page and record information blocks may be changed without departing from the scope of the invention.

Each page 104 may be one of four distinct types: FP, PURF, FURF, and FURU. Table 1 below describes the four page types and their characteristics. A page that is currently unused is called a free page (FP). A page that contains at least one data record but still has space for another data record (i.e., the data record space is not full) is called a partially used, remainder free (PURF) page. A page in which all available data records 114 are used but a remainder record 116 is unused is called a fully used, remainder free (FURF) page. A page which is entirely used is called a fully used, remainder used (FURU) page. A page is considered entirely used when all data records 114 are used and either a) a remainder record 116 doesn't exist or b) a remainder record 116 does exist and is in use. In other words, the term FURU may apply to a page even though the page does not have a remainder record 116 (i.e., where M=0).

TABLE 1

Page Types

| PageType | | Description |
| --- | --- | --- |
| FP | Free Page | Currently unused/undesignated |
| PURF | Partially Used, Remainder Free | Some, but not all, data records are used. Remainder record is unused. |
| FURF | Fully Used, Remainder Free | All data records are used. Remainder record is unused. |
| FURU | Fully Used, Remainder Used | All data records are used. Remainder record is used or is nonexistent. |

As used herein, a page may be characterized using the following notation:

page_type[(record_size[,remainder_size])]

where page_type is FP, PURF, FURF, or FURU.

For example:
PURF(X,Y) refers to a partially used, remainder free page designated for storing data records of size=X and having a remainder record of size=Y.
PURF(Z) refers to a partially used, remainder free page designated for storing data records of size=Z and having a remainder record of any size including 0 (i.e., for which remainder size is irrelevant.)
FURF(*,10) refers to a fully used, remainder free page having a remainder record of size=10 but having any data record size (i.e., for which data record size is irrelevant.)
FP refers to any free page.

Figure 2:
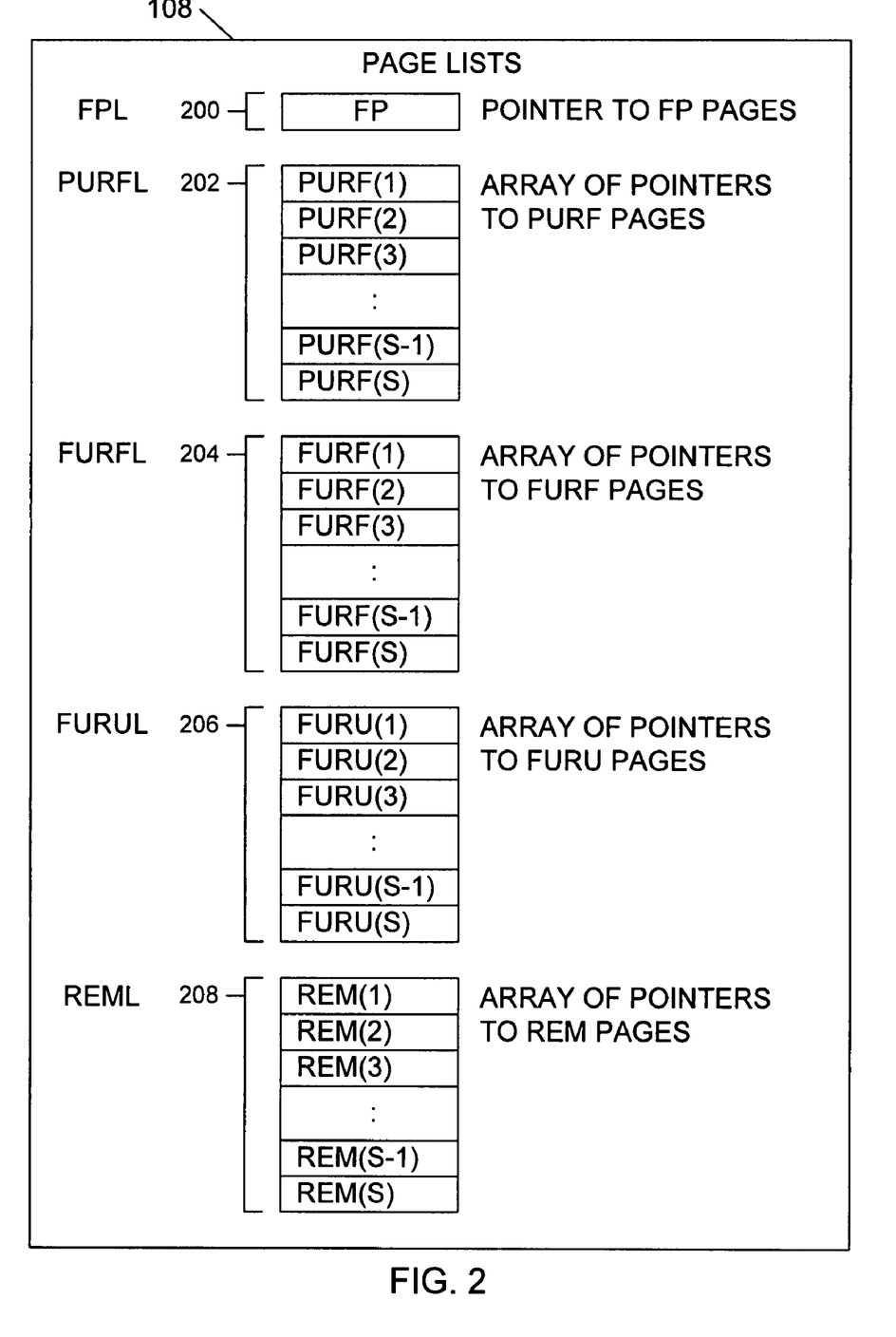
FIG. 2 is a block diagram illustrating an exemplary list structure used by a system for constant time memory management in accordance with an embodiment of the subject matter described herein.

FIG. 2 is a block diagram illustrating an exemplary list structure for use in a system for constant time memory management in accordance with an embodiment of the subject matter described herein. As described above, each page in system 100 will be one for four types (FP, PURF, FURF, and FURU). System 100 may maintain lists of pages of each type. The lists of pages may be organized according to the page type, record size, or other attribute singly or in combination.

In one embodiment, system 100 may include a list of free pages FPL 200. For example, FPL 200 may contain a list of free pages, or a pointer to a list of free pages. FPL 200 may contain a pointer to the top of a linked list of free pages, or it may contain a pointer to an array of free pages.

System 100 may include a list of PURF pages PURFL 202. PURFL 202 may be an array of pointers to PURF pages, where a PURF page is designated for each different record length stored. The array may be indexed by record length. For example, each array entry PURFL[X] may contain a pointer to a PURF page or a list of PURF pages with an available record of length=X.

System 100 may include a list of FURF pages FURFL 204. FURFL 204 may be an array of pointers to FURF pages, where a FURF page is designated for each different record length stored. The array may be indexed by record length. For example, each array entry FURFL[X] may contain a pointer to a FURF page or a list of FURF pages with an available record of length=X.

System 100 may include a list of FURU pages FURUL 206. FURUL 206 may be an array of pointers to FURU pages, where a FURU page is designated for each different record length stored. The array may be indexed by record length. For example, each array entry FURUL[X] may contain a pointer to a FURU page or a list of FURU pages with an available record of length=X.

In one embodiment, page lists may be arrays that are organized according to the size of the next record within the page that is available for use. In such embodiments, PURFL 202 may be organized according to the length of data records 114, while FURFL 204 may be organized according to the length of remainder record 116. As will be described in more detail below, when system 100 needs to find a PURF page, it is typically because system 100 needs to either add or relocate the PURF page's data records 114, i.e., in response to an allocation request or part of a relocation/backfill operation, respectively. In these two situations, the size of remainder record 116 may be irrelevant. Thus, it makes sense that a PURFL array be indexed according to the size of data records 114. In other words, each array entry PURFL[X] may contain a pointer to a PURF(X) page or to a list of PURF(X) pages. For example, PURFL[1] may contain a pointer to a PURF(1) page, PURFL[50] may contain a pointer to a PURF(50) page, and so on.

In contrast, when system 100 needs to locate a FURF page, it is typically for the purpose of filling the FURF page's remainder record 116 so that the FURF page can become a FURU page. Thus, it makes sense that a FURFL array be indexed according to the size of remainder record 116. For example, FURFL[5] may contain a pointer to a linked list of FURF(*,5) pages, FURFL[17] may contain a pointer to a linked list of FURF(*,17) pages, and so on.

It can be seen that more than one data record size may produce a page with a remainder record 116 of a particular size. For example, in a system where page size P=10, pages with data records 114 of size 3 or 9 may have remainder record 116 of size=1. Therefore, when a remainder record 116 of a particular size must be allocated, there are various algorithms that may be used to select a page from the potentially many FURF pages that have an unused remainder record 116 of the desired size. For example, a "first come, first served" allocation may be used, in which new FURF(*,X) pages are added to bottom of the linked list pointed to by FURFL[X], regardless of the size of the added page's data records 114. When a remainder record 116 of size=X is desired, the page at the top of the list pointed to by FURFL[X] may be selected, and its remainder record 116 may be used to store the data record being allocated. The page may then be reclassified, i.e., as a FURU page, and removed from the FURFL[X] list.

FURUL 206, on the other hand, may be indexed according to the size of either data records 114 or remainder record 116, whichever is more convenient or useful.

In an alternative embodiment, system 100 may include an additional list of REM pages REML 208, organized according to the size of remainder record 116. REML 208 may be useful in embodiments where PURFL 202, FURFL 204, and FURUL 206 are all organized according to the length of data records 114. For example, REML 208 may be an array of pointers to pages which contain an unused remainder record 116. In one embodiment, each array entry REML[X] may contain a pointer to a page or list of pages with an unused remainder record 116 of size=X. For example, REML[3] may point to a linked list of FURF(*,3) pages. Thus, when a remainder record 116 of size 3 is desired, the first page at the top of the linked list pointed to by REML[3] may be selected, if extant.

Alternatively, each array entry REML[X] may contain a list of sizes of data records 114 for which the page will contain a remainder record 116 of size=X. When a page with remainder record 116 of size=1 is desired, the system may read the list at REML[1] to determine which pages will have a remainder record 116 of the desired size. As in the example above, for system where page size P=10, pages with data records 114 of size 3 or 9 may have remainder record 116 of size=1, and thus REML[1] may contain the list {3,9}. In this example, the system may traverse the list to find a page with an available remainder record 116 of size 1, by first looking for a FURF(3,1) page, and if not found, by next looking for a FURF(9,1) page, and proceeding thereon. Alternatively, the list {3, 9} may be traversed in a variety of ways, including round robin, randomly, from front to back, back to front, or back and forth, for example.

Regarding implementation and operation: generally speaking, when a page changes type, the page may be moved from one page list to another page list. For example, when an unused page is designated for use to hold data records 114 of a particular size, the page may be removed from the list of FP pages and added to the list of PURF pages. Similarly, when the remainder record 116 of a FURF page is filled, the page may be moved from the list of FURF pages and added to the list of FURU pages. In embodiments which use linked lists, a page may be removed from one list and placed into another by splicing the moved page out of one linked list and splicing it into or onto another linked list.

It will be understood that various details of the presently disclosed subject matter may be changed without departing from the scope of the presently disclosed subject matter. For example, the list structures described above may be implemented using other data structures, such as arrays, pointers, lists, linked lists, other structures, or combinations thereof.

The flow charts shown in FIG. 3 and FIG. 4, below, describe how memory is allocated and freed, respectively. Conceptually, the memory management methods and systems described herein follow three general principles:

First, pages are preferably either completely full, to maximize memory utilization (because all available space within that page is used), or completely empty, to maximize memory flexibility (because that page may be designated to hold whatever size record is needed next). Thus, if, after removing a record from a page, the page is empty, i.e., the page contains no used data or remainder records, that now empty page is moved to the FP list for reuse. On the other hand, if the record released was in a FURU page, system 100 attempts to refill the FURU page using a record from a PURF page, if available, so that the page remains fully utilized.

Second, the only allowed page states are FP, PURF, FURF, and FURU; system 100 does not allow for partially filled, remainder used (PURU) pages. Thus, when filling a page, all data records must be filled before the remainder record may be filled. However, the disallowance of PURU pages complicates the process when a record is removed from a FURU page which has a remainder record and there are no other pages from which records can be taken to refill the FURU page. In this situation, if the record removed from a FURU page was the remainder record, the page becomes a PURF page, which is allowed. However, if the record removed from a FURU page was a data record, and the remainder record is still in use, the page has become a PURU page. Since PURU pages are not allowed, system 100 dismantles the PURU page by moving the remainder record elsewhere, thus converting the PURU page to a PURF page.

Third, used data records are maintained as contiguous blocks. Referring to FIG. 1, in which data records 114 are numbered from 1 to N for convenience of description, when filling a page, system 100 will allocate the available data record with the lowest number. This means that records are generally allocated in order from 1 to N. This also means, however, that when a data record is released, if the released data record is in the middle of the contiguous block of used data records, system 100 will repack the page by moving the last data record from its position at the end of the contiguous block into the space vacated by the freed data record. For example, if page 104 contains ten data records 114, of which the first four are allocated, then data records 1~4 are used and data records 6~10 are free. If data record 2 is later released (i.e., the contents of data record 2 are no longer needed and the space is made available for use), the contents of data record 4 will be moved, or backfilled, into data record 2, and data record 4 will be made available for use. Because this backfill process may occur every time a data record is released, memory pages are continually undergoing defragmentation in real time.

With these principles in mind, the processes for allocating and releasing memory are described below.

Figure 3:
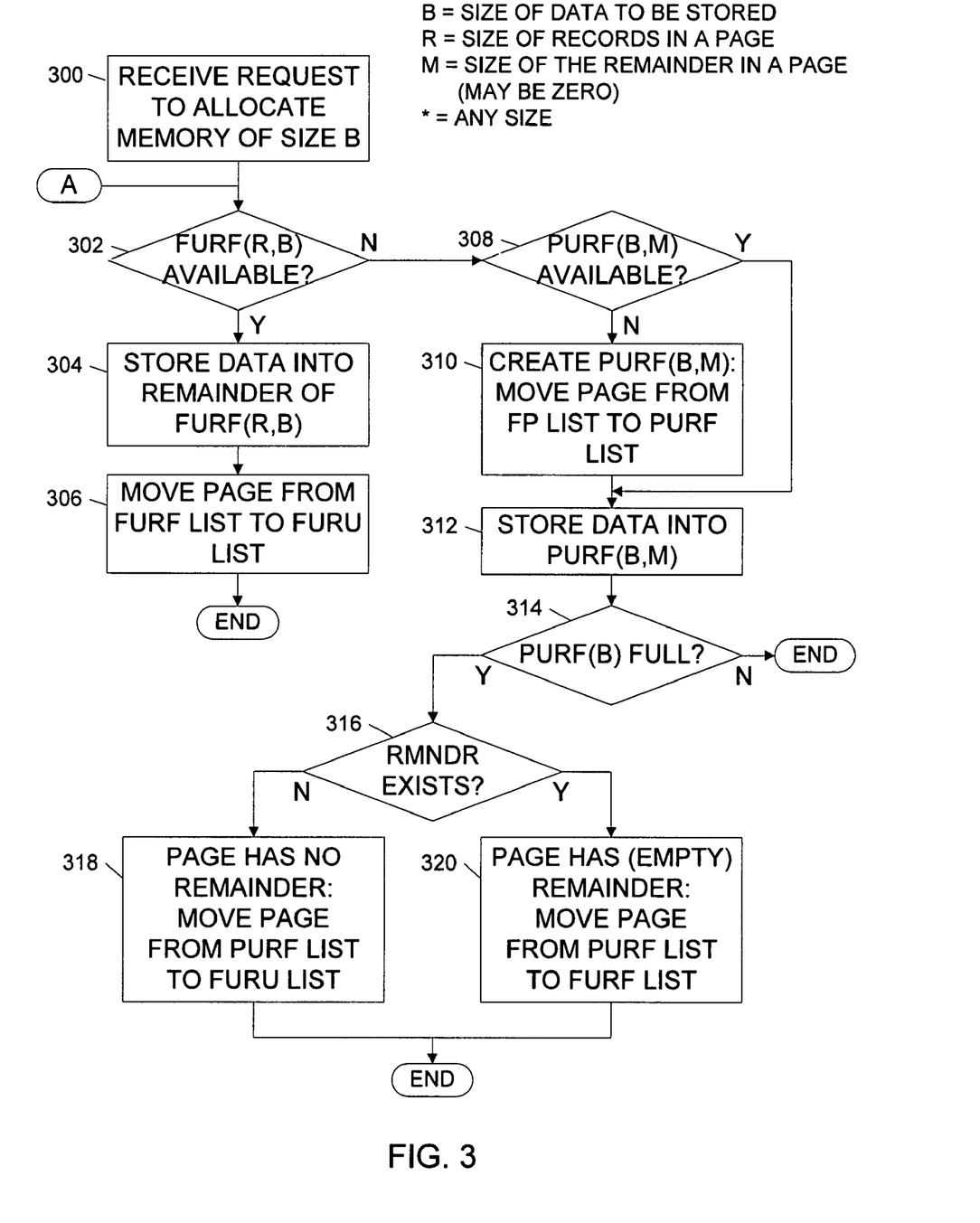
FIG. 3 is a flow chart illustrating an exemplary process for allocating memory in accordance with an embodiment of the subject matter described herein.

FIG. 3 is a flow chart illustrating an exemplary process for allocating memory in accordance with an embodiment of the subject matter described herein. In step 300, a request is received to allocate memory for a record of size=B. The memory being allocated may be used to store a new record, or it may be used to hold an existing data or remainder record that is being relocated. For example, in response to a request to store a 10-digit directory number (DN), a 10-byte record may need to be allocated.

In one exemplary implementation, memory is allocated in the following priority: first, attempt to fill the remainder record 116 of a FURF(*,B) page. If no FURF(*,B) page exists, then attempt to populate one of the data records 114 of a PURF(B,*) page. If a PURF(B) does not exist, then convert a FP page into a PURF(B) page and populate one of its data records 114.

Thus, in step 302, it is first determined whether a FURF(*, B) page is available. In some embodiments, this may be done by checking to see if the list pointed to by REML[B] contains any pages. In alternative embodiments, the list of FURF pages FURFL 204 may be traversed to find a page with a remainder record 116 of the desired size, B.

If in step 302 a FURF(*,B) page is available, the process moves to step 304, in which the data is stored in the remainder record 116 of the FURF(*,B) page, then to step 306, in which the page is reclassified as a FURU page and moved from the list of FURF pages to the list of FURU pages. For example, if a FURF(R,10) page is found (step 302), the 10-byte data is stored in the remainder record 116 of the FURF(R,10) page (step 304), and the page is reclassified as FURU (step 306).

However, if in step 302 it is determined that a FURF(*,B) is not available, the process moves to step 308, in which it is determined whether a PURF(B) page is available. If in step 308 a PURF(B) page is not found, the process first moves to step 310, in which a new PURF(B) page is allocated by removing an unused page from the FP list and adding it to the list of PURF(B) pages, and next moves to step 312; otherwise, the process moves directly to step 312, in which the data is stored into an available data record of the PURF(B) page. After step 312 the PURF(B) page may need to be reclassified.

Thus, in step 314, it is determined whether the PURF(B) page is full, where "full" means that the PURF(B) page has no more space for data records 114 of size=B. If the PURF(B) page is not full, the process ends, and the page remains in the PURF list. If the PURF(B) page is full, the page must be reclassified as either FURF or FURU, depending on whether or not the page has a remainder record 116: if remainder record 116 does not exist, the page may be classified as FURU; if remainder record 116 does exist, the page may be classified as FURF.

Thus, in step 316, it is determined whether or not a page has remainder record 116. In one exemplary embodiment, whether or not a page has a remainder record 116 may be determined by considering the value of M. For example, if M=0, this may indicate that the page does not have a remainder record 116, while a non-zero value for M may indicate that the page does have a remainder record 116.

If in step 316 it is determined that the page has no space for a remainder record 116 (i.e., M=0), the page is therefore completely full, and thus the process moves to step 318, in which the page is reclassified as FURU and moved from the list of PURF pages to the list of FURU pages.

However, if in step 316 it is determined that the page does have remainder record 116, the page is not completely full, and thus the process moves to step 320, in which the page is reclassified as FURF and moved from the list of PURF pages to the list of FURF pages. Note that because the algorithm does not fill a remainder record 116 unless all data records 114 are full, in step 320 it is not necessary to check whether remainder record 116 is occupied before classifying the page as PURF.

Note also that due to the nature of the algorithm, which prefers pages to be FP or FURU rather than PURF or FURF, no more than one PURF(B) page will be needed at any time. In contrast, multiple FURF(B) or FURU(B) pages may exist.

Figure 4:
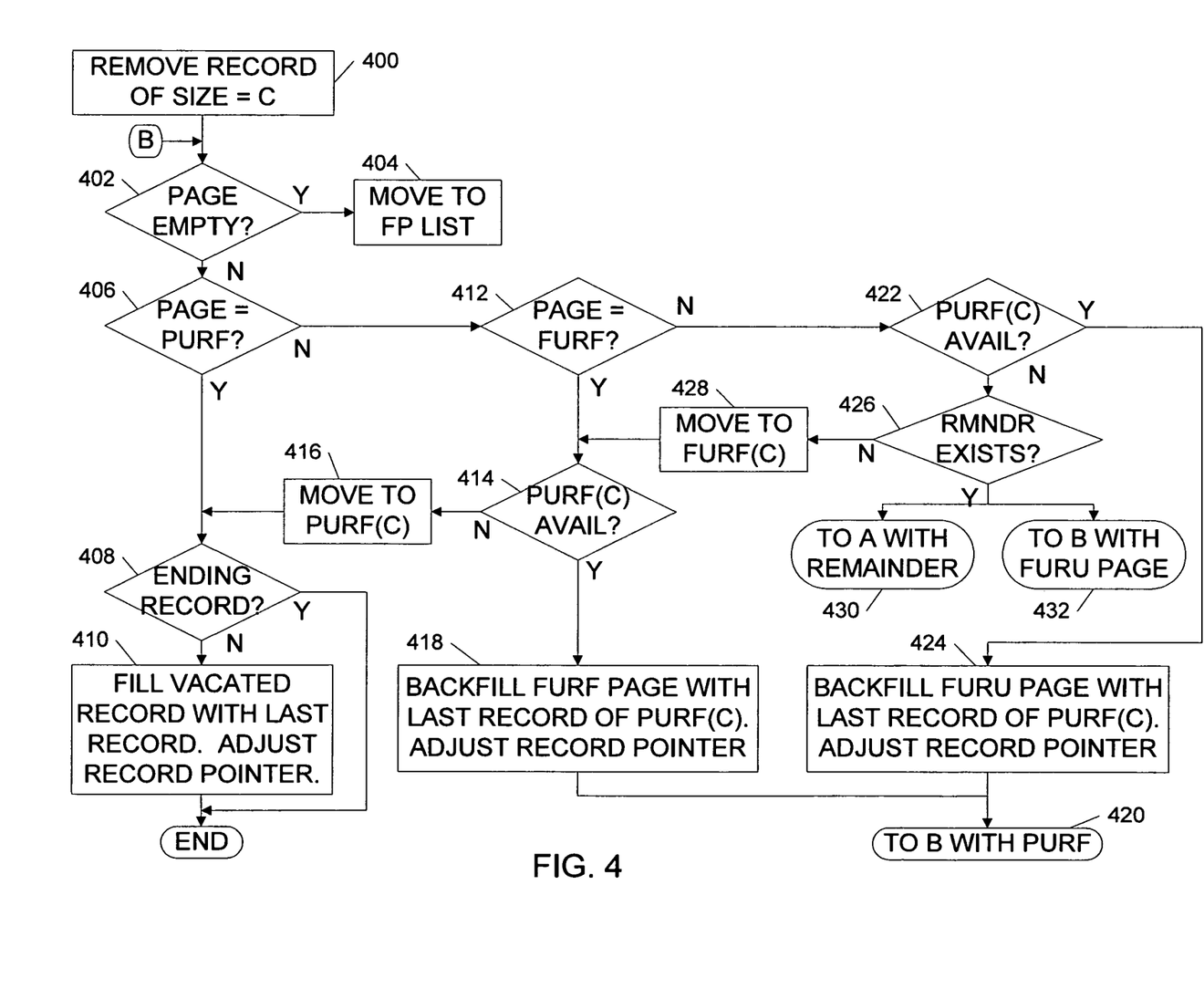
FIG. 4 is a flow chart illustrating an exemplary process for releasing memory in accordance with an embodiment of the subject matter described herein.

FIG. 4 is a flow chart illustrating an exemplary process for releasing memory in accordance with an embodiment of the subject matter described herein. In FIG. 4, the process starts with step 400, in which a record of size=C is removed from a page. In step 402, it is determined whether the page from which the record was removed is empty, where "empty" means that the page contains neither data records 114 nor a remainder record 116.

If in step 402 it is determined that the page is empty, the process moves to step 404, in which the page is moved to the FP list from whatever list in which it was located previously. For example, if the record was removed from a PURF(C) page containing only that record, that now empty PURF(C) page may be moved to the FP list, after which the process would end.

However, if in step 402 it is determined that the page is not empty, the page's state prior to removal of the record of size=C must be considered in order to determine whether and how to backfill the page.

In step 406, it is determined whether the page was a PURF. If in step 406 it is determined that the page was a PURF, the process moves to step 408, in which it is determined whether the record released was the last record in the page. If the record released was the last record in the page, the process ends. If the record released was not the last record in the page, the process moves to step 410, in which the page is compacted by moving the last non-available (i.e., used) data record in the page from its current location into the hole formerly occupied by the released record, after which the process ends.

However, if in step 406 it was determined that the page was not a PURF, the process moves to step 412, in which it is determined whether the page was a FURF.

If in step 412 it is determined that the page was a FURF, it is desired to backfill the FURF with a record from a PURF, if available, so that the FURF page continues to be a FURF. Thus, if the page was a FURF, the process moves to step 414, in which a PURF holding records of size=C is sought. If in step 414 a PURF(C) was not found, the process moves to step 416, in which the page is reclassified from FURF to PURF and compacted via step 408 and step 410. However, if in step 414 a PURF(C) is found, the process moves to step 418, in which the FURF page is backfilled with the last record of from the PURF(C) page, and the FURF page remains a FURF page. At this point, a record has been removed from the PURF(C) page, however, and so in step 420, the process starts again at entry point B, this time for the purpose of processing the PURF(C) page which was used to backfill the FURF page.

However, if in step 412 it was determined that the page was not a FURF, then the page was a FURU. It is desired to backfill a FURU with a record from a PURF, if available, so that the FURU page continues to be a FURU. Note that the record deleted from a FURU could have been one of the data records 114 or the remainder record 116. Thus, if the page was a FURU, the process moves to step 422, in which it is determined whether a PURF(C) page is available.

If in step 422 a PURF(C) page is found, the process moves to step 424, in which either the deleted data record or the deleted remainder record of the FURU page is backfilled from the last data record of the PURF(C) page, then to step 420, continuing as described above. However, if in step 422 no PURF(C) page is available from which to backfill the FURU page, the FURU page must be dismantled, and the process moves to step 426.

In step 426 it is determined whether a remainder record 116 exists, since, depending on the record size, a page may not have a remainder record 116. If in step 426 it is determined the page has no remainder record 116, the process moves to step 428, in which the page is reclassified as a FURF. The newly reclassified page is processed as a FURF page would be, starting with step 414 and continuing as described above.

However, if in step 426 it is determined that the page does have a remainder record 116, the process performs the sibling steps 430 and 432, in which the FURU page's remainder record 116 is relocated, starting at entry point A in FIG. 3, and in which the FURU page is processed, starting at entry point B in FIG. 4, respectively. These two steps may be performed in parallel, or sequentially in any order.

It can be seen from the example above that the defragmentation method described herein takes constant time—that is, the number of steps taken does not depend upon the size of the memory, the amount or percentage of the memory currently used, or the amount or percentage of the memory currently free. Thus, a system designer may more accurately determine how many system resources may be required for memory management, and for how long those resources may be required. This may allow the designer to safely plan how these system resources may be made available for other tasks. Furthermore, the defragmentation operation occurs in real-time, at the time that memory is allocated or freed, and thus avoids the problems caused by methods that allow memory to become progressively more fragmented before executing a defragmentation routine, such as the sudden and potentially harmful unavailability of memory of the required size and the potentially harmful lack of processing power available to perform the system's primary function due to the system load on the processor, memory, and data paths during intensive large-scale memory defragmentation.

Figure 5:
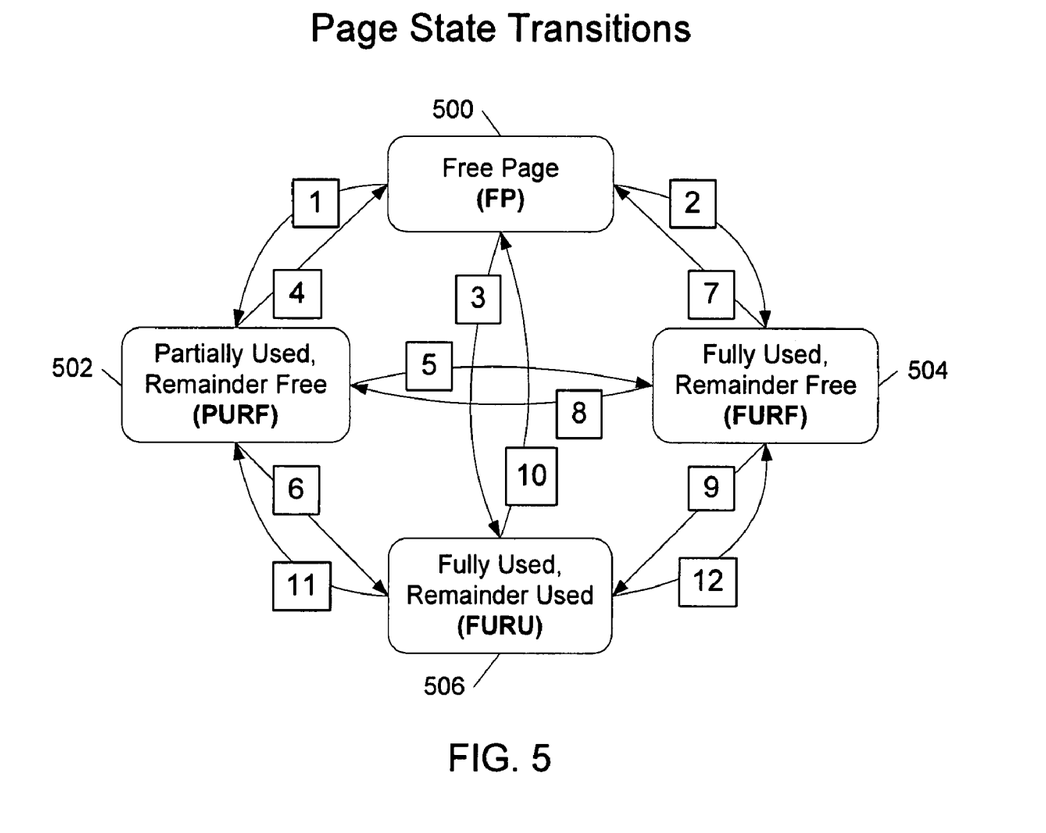
FIG. 5 is a state diagram illustrating exemplary page state transitions in accordance with an embodiment of the subject matter described herein.

FIG. 5 is a state diagram illustrating exemplary page state transitions in accordance with an embodiment of the subject matter described herein. Every page in memory may be in one of four states: Free Page (FP) 500, Partially Used, Remainder Free (PURF) 502, Fully Used, Remainder Free (FURF) 504, or Fully Used, Remainder Used (FURU) 506. In FIG. 5, each state transition is numbered with a transition identifier (XID). Table 2 below lists the description of each transition.

able memory may be very limited; and waiting until a defragmentation threshold is reached before performing cumulative defragmentation my unacceptably degrade performance.

The subject matter disclosed herein addresses and meets these needs in several ways. First, the use of fixed-sized pages allows page boundaries to be algorithmically, and thus relatively quickly, determined. Second, the designation of a page as one that holds records of only a certain size (i.e., R and M) allows algorithmic determination of record boundaries within the page, and, importantly, greatly reduces the number of places that system 100 must search to find a free record of a particular size. This results in allocation and release of memory that may be fast enough to meet even very tight maximum timing requirements. Furthermore, the search for a free record is a deterministic process; that is, the time that a search will take is not dependent upon the current utilization of the memory. Third, because defragmentation occurs continually and in real-time, even if table contents are continually updated, it is unlikely that a cumulative defragmentation

TABLE 2

Page State Transitions

| XID | From | To | Description |
|---|---|---|---|
| 1 | FP | PURF | Request for record size R:<br>No remainders of size R available; no PURF of size R available. Record size ≦ (page size/2); Record size creates remainder. |
| 2 | FP | FURF | Request for record size R:<br>No remainders of size R available; no PURF of size R available. Record size > (page size/2); Record size creates remainder. |
| 3 | FP | FURU | Request for record size R:<br>No remainders of size R available; no PURF of size R available. Record size > (page size/2); Record size does NOT create remainder. |
| 4 | PURF | FP | Record of size R deleted from PURF:<br>PURF now empty. |
| 5 | PURF | FURF | Record of size R added to PURF:<br>PURF now full except for remainder. |
| 6 | PURF | FURU | Record of size R added to PURF:<br>Record size does NOT create remainder. (i.e., page is now totally full). |
| 7 | FURF | FP | Record of size R deleted from FURF:<br>FURF now empty. |
| 8 | FURF | PURF | Record of size R deleted from FURF:<br>FURF is NOT empty; No PURF of size R available from which a record of size R can be moved into FURF to backfill. |
| 9 | FURF | FURU | Record of size M added to FURF:<br>FURF remainder is now filled; FURF is now full. |
| 10 | FURU | FP | Record of size R deleted from FURU:<br>FURU page is empty; Record size does NOT create remainder. |
| 11 | FURU | PURF | Record of size R deleted from FURU:<br>FURU page is not empty; Record size does NOT create remainder. |
| 12 | FURU | FURF | Remainder of size M deleted from FURU:<br>No PURF of size M available from which a record of size M can be moved into FURU to backfill. |

Examples of systems that would benefit from the memory management methods, systems, and computer program products described herein include number portability (NP), E.164 number mapping (ENUM), and Tekelec G-Flex® HLR Manager. For example, a typical NP function may map a directory number to a routing number. The NP database thus may have stringent performance requirements: it may be required to maintain large lookup tables of fixed-size records; allocation and release of memory may have severe maximum timing constraints; these tables may be continually updated; available memory is very limited.

operation, with its attendant degradation of overall system performance, will occur or even be needed. Finally, the combination of an efficient page structure and continual defragmentation results in an efficient use of memory. This efficiency is especially desirable in systems where available memory is very limited.

Similar to NP, ENUM applications map E.164-formatted subscriber numbers to domain names, involve fixed-size database records, and may benefit from the subject matter described herein in the same way as NP. The G-Flex® HLR Manager maps mobile subscriber identifiers to HLR addresses and may also benefit from the subject matter described herein in the same manner as that described above for NP.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for memory management, the method comprising:
   (a) dividing a memory to be allocated, the memory being divided into a plurality of pages of equal size P, each page having a space of size P' within the page for storing records;
   (b) for each of the plurality of pages, designating the page as being for storing one or more records of the page's respective size $R_{PAGE}$, zero or one record of the page's respective size $M_{PAGE}$, where $M_{PAGE}=$P' modulo $R_{PAGE}$, and no records of any other size, wherein one page's designated size $R_{PAGE}$ is different from another page's designated size $R_{PAGE}$, and wherein at least one of the plurality of pages contains an $M_{PAGE}$ record having a non-zero size; and
   (c) allocating the memory such that each of the plurality of pages is populated with one or more records of the page's respective size $R_{PAGE}$ and with zero or one records of the page's respective size $M_{PAGE}$.

2. The method of claim 1 wherein allocating the memory includes, in response to a request to allocate memory for a record of size B, allocating memory from the pages in the following priority:
   (a) filling a record of size $M_{PAGE}$, where $M_{PAGE}=$B, in an otherwise fully utilized page;
   (b) populating a partially filled page for holding records of size $R_{PAGE}$, where $R_{PAGE}=$B; and
   (c) designating and populating a new page for holding records of size $R_{PAGE}$, where $R_{PAGE}=$B.

3. The method of claim 1 comprising releasing, in response to a request to free a record of size C, memory used by the record of size C, wherein releasing memory includes at least one of: identifying an empty page as available for reuse, refilling a formerly full page using a record taken from a partially filled page so that the formerly full page remains full, and defragmenting a partially filled page.

4. The method of claim 3 wherein defragmenting the partially filled page includes backfilling an empty record of size $R_{PAGE}$ in the partially filled page using the last non-available record of size $R_{PAGE}$ in the partially filled page.

5. The method of claim 3 wherein defragmenting the partially filled page includes backfilling an empty record of size $R_{PAGE}$ in the partially filled page using a record of size $R_{PAGE}$ from another page.

6. The method of claim 3 wherein defragmenting the partially filled page includes moving a record of size $M_{PAGE}$ from the partially filled page into another page.

7. The method of claim 1 wherein allocating the memory includes allocating memory for a number portability (NP) record.

8. The method of claim 1 wherein allocating the memory includes allocating memory for an E.164 number mapping (ENUM) record.

9. The method of claim 1 wherein allocating the memory includes allocating memory for a subscriber record.

10. The method of claim 1 comprising classifying each of the plurality of pages as one of a free page (FP), a partially-used, remainder free page (PURF), a fully-used, remainder free page (FURF), and a fully-used remainder used page (FURU).

11. The method of claim 1 comprising maintaining lists of at least some of the pages of the memory based on at least one of page classification, $R_{PAGE}$ value, and $M_{PAGE}$ value.

12. The method of claim 1 wherein each of the plurality of pages is associated with a respective page information block for containing information, other than records of size $R_{PAGE}$ and records of size $M_{PAGE}$, associated with the respective page.

13. The method of claim 12 wherein the information associated with the respective page includes at least one of a value of $R_{PAGE}$, a value of $M_{PAGE}$, a value indicating the maximum capacity of records of size $R_{PAGE}$ within the page, a value indicating the number of records of size $R_{PAGE}$ currently allocated within the page, a value indicating the number of records of size $R_{PAGE}$ currently available for allocation within the page, a pointer to a previous page in a linked list, and a pointer to a next page in a linked list.

14. The method of claim 1 comprising associating at least one of metadata, checksum data, and owner information with each record of size $R_{PAGE}$ and record of size $M_{PAGE}$ for which memory is allocated.

15. The method of claim 1 wherein each page of equal size P includes a page information block of size Q for storing information specific to the page and a record information block of size I for storing information specific to each data record or remainder record in the page and wherein P'=P−(Q+I).

16. The method of claim 15 wherein each page's information block is used for storing the values of $R_{PAGE}$ and $M_{PAGE}$ for the page.

17. A system for memory management, the system comprising:
   (a) a memory for storing records, the memory being divided into a plurality of pages of equal size P, each page having space of size P' within the page for storing records, wherein for each of the plurality of pages, the page is designated as being for storing one or more records of the page's respective size $R_{PAGE}$, zero or one record of the page's respective size $M_{PAGE}$, where $M_{PAGE}=$P' modulo $R_{PAGE}$, and no records of any other size, wherein one page's designated size $R_{page}$ is different from another page's designated size $R_{PAGE}$, and wherein at least one of the plurality of pages contains an $M_{PAGE}$ record having a non-zero size; and
   (b) a memory manager for allocating the memory so that each of the plurality of pages is populated with one or more records of the page's respective size $R_{PAGE}$ and with zero or one records of the page's respective size $M_{PAGE}$.

18. The system of claim 17 wherein the memory manager is configured to allocate memory for a block of size B in the following priority:
   (a) fill a record of size $M_{PAGE}$, where $M_{PAGE}=$B, in an otherwise fully utilized page;
   (b) populate a partially filled page for holding records of size $R_{PAGE}$, where $R_{PAGE}=$B; and
   (c) designate and populate a new page for holding records of size $R_{PAGE}$, where $R_{PAGE}=$B.

19. The system of claim 17 wherein the memory manager is configured to release memory, wherein releasing memory includes identifying an empty page as available for reuse, refilling a formerly full page using a record taken from a partially filled page so that the formerly full page remains full, and defragmenting a partially filled page.

20. The system of claim 19 wherein the memory manager is configured to defragment a partially filled page by backfilling an empty record of size $R_{PAGE}$ in the partially filled page using the last non-available record of size $R_{PAGE}$ in the partially filled page.

21. The system of claim 19 wherein the memory manager is configured to defragment a partially filled page by backfilling an empty record of size $R_{PAGE}$ in the partially filled page using a record of size $R_{PAGE}$ from another page.

22. The system of claim 19 wherein the memory manager is configured to defragment a partially filled page by moving a record of size $M_{PAGE}$ from the partially filled page into another page.

23. The system of claim 17 wherein each of the plurality of pages is classified as one of a free page (FP), a partially-used, remainder free page (PURF), a fully-used, remainder free page (FURF), and a fully-used remainder used page (FURU).

24. The system of claim 17 wherein the memory manager is configured to maintain lists of at least some of the pages of the memory based on at least one of page classification $R_{PAGE}$ value, and $M_{PAGE}$ value.

25. The system of claim 17 wherein each of the plurality of pages is associated with a respective page information block for containing information, other than records of size $R_{PAGE}$ and records of size $M_{PAGE}$, associated with the respective page.

26. The system of claim 25 wherein the information associated with the respective page includes at least one of a value of $R_{PAGE}$, a value of $M_{PAGE}$, a value indicating the maximum capacity of records of size $R_{PAGE}$ within the page, a value indicating the number of records of size $R_{PAGE}$ currently allocated within the page, a value indicating the number of records of size $R_{PAGE}$ currently available for allocation within the page, a pointer to a previous page in a linked list, and a pointer to a next page in a linked list.

27. The system of claim 17 wherein the memory manager is configured to associate at least one of metadata, checksum data, and owner information with each record of size $R_{PAGE}$ and record of size $M_{PAGE}$ for which memory is allocated.

28. The system of claim 17 wherein each page of equal size P includes a page information block of size Q for storing information specific to the page and a record information block of size I for storing information specific to each data record or remainder record in the page and wherein $P'=P-(Q+I)$.

29. The system of claim 28 wherein each page's information block is used for storing the values of $R_{PAGE}$ and $M_{PAGE}$ for the page.

30. A computer program product comprising computer executable instructions embodied in a non-transitory computer readable medium for performing steps comprising:
(a) dividing memory to be allocated into a plurality of pages of equal size P, each page having space of size P' within the page for storing records;
(b) for each of the plurality of pages, designating the page as being for storing one or more records of the page's respective size $R_{PAGE}$, zero or one record of the page's respective size $M_{PAGE}$, where $M_{PAGE}=P'$ modulo $R_{PAGE}$, and no records of any other size, wherein one page's designated size $R_{PAGE}$ is different from another page's designated size $R_{PAGE}$ and wherein at least one of the plurality of pages contains an $M_{PAGE}$ record having a non-zero size; and
(c) allocating the memory such that each page is populated with one or more records of the page's respective size $R_{PAGE}$ and with zero or one records of the page's respective size $M_{PAGE}$.

31. The computer program product of claim 30 wherein allocating the memory includes, in response to a request to allocate memory for a record of size B, allocating memory from the pages in the following priority:
(a) filling a record of size $M_{PAGE}$, where $M_{PAGE}=B$, in an otherwise fully utilized page;
(b) populating a partially filled page for holding records of size $R_{PAGE}$, where $R_{PAGE}=B$; and
(c) designating and populating a new page for holding records of size $R_{PAGE}$, where $R_{PAGE}=B$.

32. The computer program product of claim 30 for performing steps comprising releasing, in response to a request to free a record of size C, memory used by the record of size C, wherein releasing memory includes at least one of: identifying an empty page as available for reuse, refilling a formerly full page using a record taken from a partially filled page so that the formerly full page remains full, and defragmenting a partially filled page.

33. The computer program product of claim 30 wherein each page of equal size P includes a page information block of size Q for storing information specific to the page and a record information block of size I for storing information specific to each data record or remainder record in the page and wherein $P'=P-(Q+I)$.

34. The computer program product of claim 33 wherein each page's information block is used for storing the values of $R_{PAGE}$ and $M_{PAGE}$ for the page.

* * * * *